July 28, 1970   S. J. SORROW   3,521,851
FLOATING VALVE SEAL
Filed Aug. 23, 1968

INVENTOR
STEPHEN J. SORROW

BY *Lindsey, Prutzman and Hayes*

ATTORNEYS

United States Patent Office 3,521,851
Patented July 28, 1970

3,521,851
FLOATING VALVE SEAL
Stephen J. Sorrow, Suffield, Conn., assignor to Skinner Precision Industries, Inc., New Britain, Conn., a corporation of Connecticut
Filed Aug. 23, 1968, Ser. No. 754,919
Int. Cl. F16k *11/02, 25/00, 31/02*
U.S. Cl. 251—85                1 Claim

ABSTRACT OF THE DISCLOSURE

An electrically operated valve assembly having a plunger operable in a flow passage to control fluid flow, and a floating circular valve member loosely confined in a cavity within the plunger, the valve member being pressed by a spring toward a valve seat and self-vented through peripheral flutes circumferentially disposed about the valve member for ensuring full length stroking of the plunger and complete valve sealing while precluding entrapment of fluid behind the valve member.

---

This invention relates to solenoid operated fluid flow control valves and particularly concerns those valves of the type shown in U.S. Pat. No. 3,172,637 assigned to the assignee of this invention.

A primary object of this invention is to provide an improved valve seal assembly for a solenoid operated valve particularly suited to ensure that a valve plunger is fully seated to establish a closed magnetic circuit.

Another object of this invention is to provide a simplified floating valve seal and plunger combination for solenoid operated valves which accommodates physical changes in the valve sealing material as well as manufacturing variations and tolerances.

A further object of this invention is to provide an improved floating valve seal and plunger combination for solenoid operated valves which eliminates any need for drilling vent or bleed passages in the plunger for relieving entrapment of fluid behind a valve member.

A better understanding of the objects, advantages, features, properties and relationships of the invention will be obtained from the following detailed description and accompanying drawing which set forth an illustrative embodiment and are indicative of the way in which the principle of the invention is employed.

Figure 1:
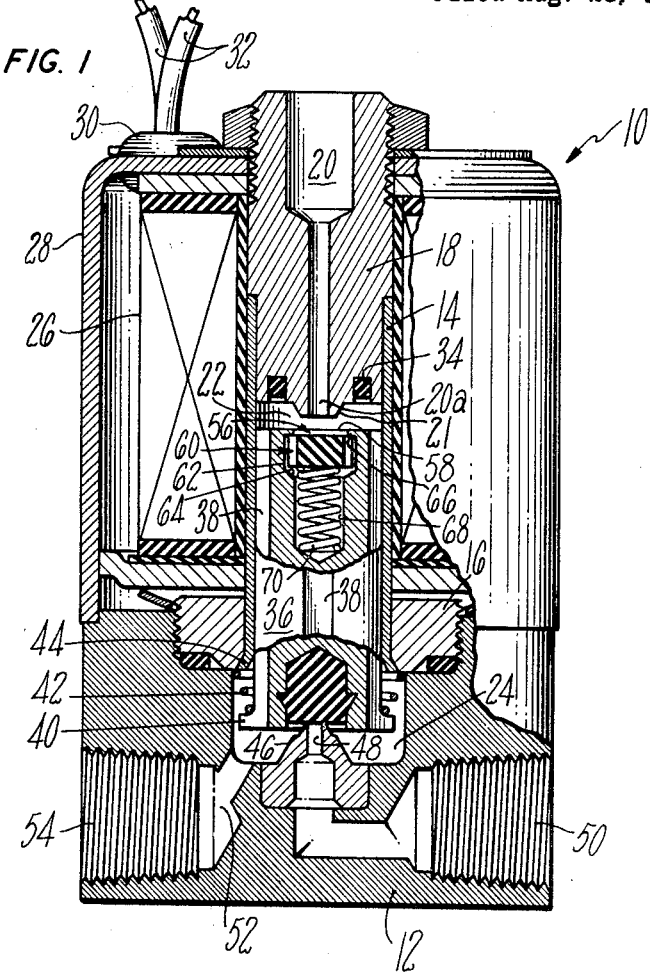
FIG. 1 is a side view, partly in section and partly broken away, of a solenoid valve incorporating a floating seal and plunger combination of this invention.
Figure 2:
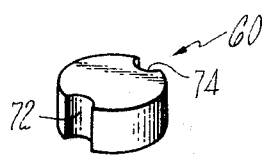
FIG. 2 is an enlarged isometric view of the valve member.
Figure 3:
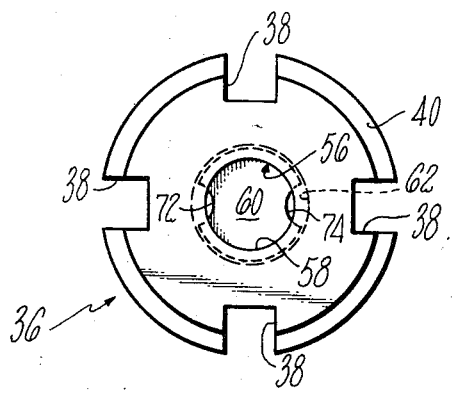
FIG. 3 is an enlarged end view of a valve plunger with the valve member mounted therein.

Referring now to the drawing in detail wherein a preferred embodiment of this invention is illustrated, a solenoid valve assembly 10 is shown having a body 12 to which a nonmagnetic sleeve 14 is secured by a threaded collar 16. An outer end of the sleeve 14 has a nipple 18 of magnetic material fitted therein providing an exhaust passage 20 having an inlet orifice 20a surrounded by a valve seat 21 projecting into a chamber 22 jointly defined by the sleeve 14 and a compartment 24 formed in the body 12.

The sleeve 14 is surrounded by a solenoid coil 26 enclosed by a housing 28 suitably secured to the body 12 and having a fitting 30 through which lead-in wires 32 for the coil 26 extend for connecting it to a suitable source of electrical power. Concentric with the valve seat 21 is an annular slot in the nipple 18 containing the usual shading ring 34 of highly conductive material for use in A.C. applications of the valve assembly 10.

A reciprocable bi-positional plunger 36 is received for sliding movement within the sleeve 14 and slots 38 along the length of the plunger 36 provide free flow of fluid between the plunger 36 and the sleeve 14. The plunger 36 is shown having a radial end flange 40, and a return compression spring 32 is seated between the flange 40 and an inner flared end 44 of the sleeve 14. Thus the plunger 36 is normally held in its illustrated position with the spring 42 urging the plunger 36 against a lower valve seat 46 surrounding an orifice 48 leading to an inlet port 50 which is connected via a passage 52 to a cylinder port 54 upon energizing the coil 26. In the normal, that is the de-energized condition of the valve assembly 10, the exhaust passage 20 is therefore open to the cylinder port 54. Energizing the coil 26 establishes a magnetic field which overcomes the spring force and causes the plunger 36 to move into contact with the nipple 18.

To ensure that no air gap will occur and that a closed magnetic circuit is established as the plunger 36 moves upwardly, a cavity 56 is formed in the top of the plunger 36 for receiving the projecting valve seat 21. The valve seat 21 is shown chamfered to provide a truncated tapered surface which fits within an end opening 58 of the plunger cavity 56.

To ensure effective sealing of the exhaust passage 20 each time the coil 26 is energized, a generally flat, circular valve member 60 is provided in confined relation within an enlarged compartment 62 formed within the plunger cavity 56. The valve member 60 is preferably formed of elastomeric material such as rubber or any similar tough, durable material which is resilient, chemical resistant and stands up well under exposure to repeated impact forces. Manufacturing variations and tolerances are accommodated while ensuring complete sealing of the exhaust passage 20, since the valve member 60 is permitted to float or travel within the compartment 62 to a predetermined extent limited by annular radial shoulders 64 and 66 at opposite axial ends of the compartment 62 respectively communicating with an inner chamber portion 68 and the aforementioned end opening 58 at the top of the plunger 36. The portions of the cavity 56 adjoining the compartment 62 are coaxially aligned therewith and of relatively reduced diameter whereby by the valve member 60 is trapped within the plunger 36, and a coil compression spring 70 received within the inner spring chamber portion 68 continuously presses the valve member 60 against the shoulder 66 and toward the valve seat 21. Accordingly, as the plunger 36 moves toward the nipple 18, the exhaust passage 20 is effectively sealed and the spring 70 maintains sealing engagement even if the plunger 36 tends to vibrate during operation under adverse conditions. In addition to firmly maintaining the valve member 60 in sealing engagement with the valve seat 21, the above described floating valve member construction has the virtue of automatically accommodating any changes in the physical characteristics of the valve member 60, such as hardening or swelling, while preventing any bulging of the valve member out of the plunger cavity 56.

Another feature of this invention resides in the provision of an inexpensive sealing assembly which automatically vents the plunger cavity 56 without requiring any expensive boring or drilling of bleed passages or vents. In the specific illustrated embodiment, the valve member 60 is provided with peripheral flutes 72, 74 extending the full thickness of the valve member 60 and which are sufficiently deep to project radially inwardly of the inner edge of the plunger shoulder 66 whereby, regardless of the position of the plunger 36, continuous passage is provided for fluid from the spring chamber portion 68 to the chamber 22. Such fluid might otherwise become trapped behind the valve member 60 and reduce the stroke length of the plunger 36, decreasing the overall efficiency of the valve by failing to minimize the air gap between the plunger 36 and nipple 18. Such structure considerably reduces manufacturing costs by eliminating any need whatsoever to drill vent or bleed passages, and yet provides an effective top floating seal combined with a suitable plunger in a solenoid valve having a minimal number of parts suited for low cost manufacture and assembly.

As will be apparent to persons skilled in the art, various modifications, adaptations and variations of the foregoing specific disclosure can be made without departing from the teachings of the present invention.

I claim:

1. A valve assembly comprising a body including a valve seat, a flow passage having a chamber and extending through the valve seat, a plunger reciprocable within the chamber toward and away from the valve seat for controlling fluid flow through the passage, the plunger having a cavity which opens at one end of the plunger adjacent the valve seat, the cavity having a reduced opening at said one end of the plunger defined by a radially inwardly directed annular shoulder at said one end of the plunger, a generally flat circular valve member formed of elastomeric material confined for floating movement within the cavity of the plunger, and biasing means continuously urging the valve member outwardly toward the valve seat for sealing engagement therewith, the valve member having a peripheral flute extending throughout the full thickness of the valve member and being dimensioned to project radially inwardly of the shoulder at said one end of the plunger for ensuring that continuous communication is established between an interior portion of the cavity and the chamber regardless of the relative position of the floating valve member to the plunger.

References Cited

UNITED STATES PATENTS

| 2,311,110 | 2/1943 | Johnson | 251—85 XR |
| 1,986,299 | 1/1935 | Steven | 251—88 XR |
| 2,750,962 | 6/1956 | Kreitchman et al. | 251—84 XR |
| 2,879,794 | 3/1951 | Costello | 251—85 XR |
| 3,043,336 | 7/1962 | Parent et al. | 251—139 XR |

FOREIGN PATENTS 984,260  2/1965  Great Britain.

HENRY T. KLINKSIEK, Primary Examiner

U.S. Cl. X.R.

251—139; 137—625.65